Jan. 17, 1967   J. C. BOTELER   3,298,725
HIGH-STRENGTH FASTENER
Filed Oct. 1, 1964
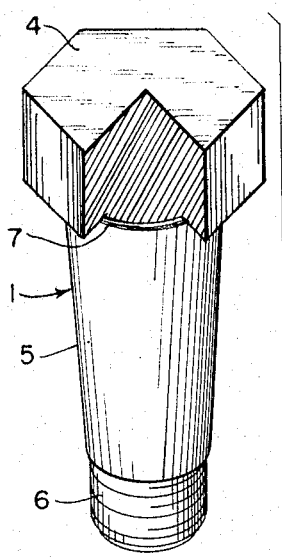
FIG. 1
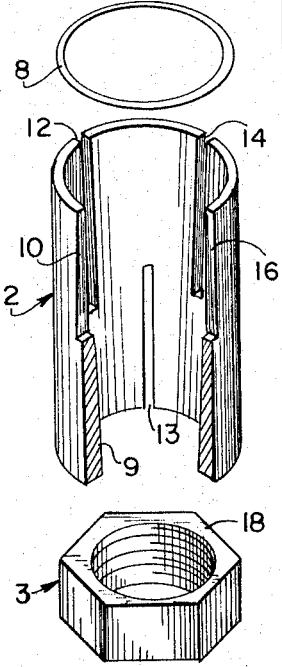
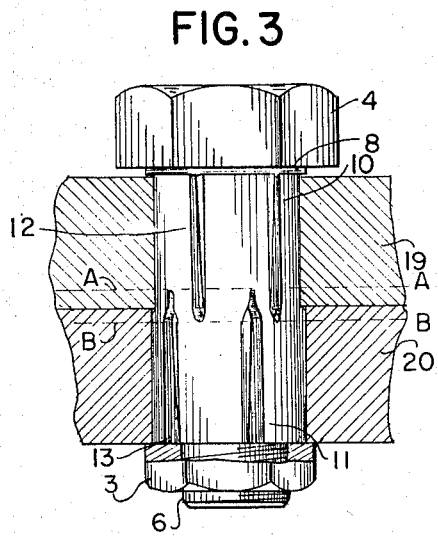
FIG. 3
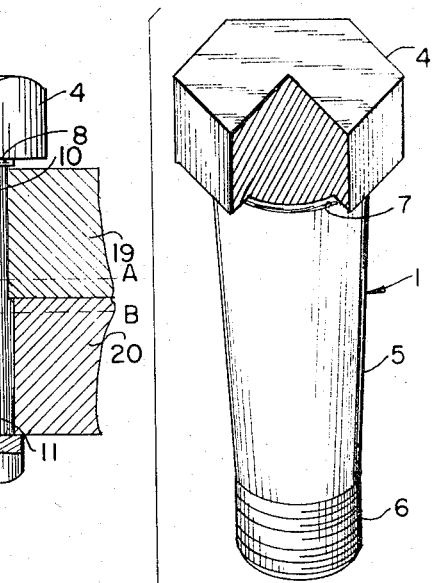
FIG. 2
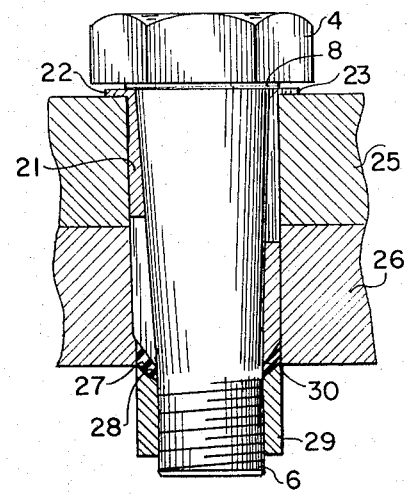
FIG. 4
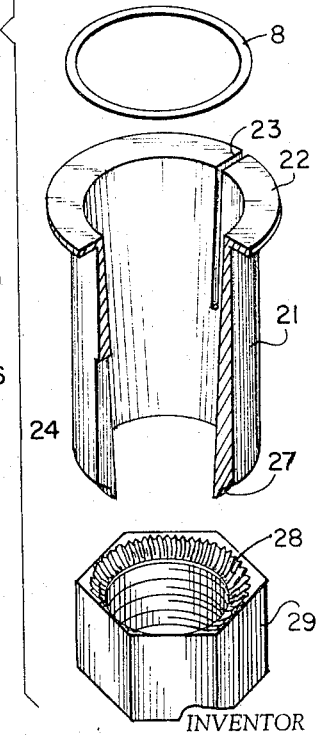
INVENTOR
J. C. BOTELER
BY *Smith, Michael, Bradford & Jardine*
ATTORNEYS

3,298,725
HIGH-STRENGTH FASTENER
John C. Boteler, 4120 Angus Drive,
Fort Worth, Tex. 76116
Filed Oct. 1, 1964, Ser. No. 400,805
10 Claims. (Cl. 287—189.36)

This invention relates to a high-strength fastener assembly which exhibits fatigue characteristics sufficiently high to qualify it particularly for use in aircraft, missile and space applications.

More particularly, this invention relates to a fastener which will exhibit a minimum of internal stress, reduce stress concentration in the material being joined, and apply an evenly distributed radial pre-stress to the material being joined.

The demands placed upon aircraft and missile structures by the extreme high temperature ranges and sonic vibration levels to which they are subjected has resulted in the use of high-strength, or "exotic" metals and refractories for structural members of the aircraft or missile. Among these "exotic" materials are titanium, tantalum, columbium and such alloys as are known commercially as:

| | |
|---|---|
| 4130 Steel | Hastalloy |
| 4140 Steel | Inconel X |
| 4340 Steel | Rene 41 |
| Monel | D6 AC |
| A286 Stainless Steel | 19-9-DL |
| D979 | 19-9-DX |
| Greek Ascaloy | Discalloy |
| Vasco Jet (H11) | M252 |
| Waspalloy | S-590 |
| Udimet 500 | V-36 |
| N-155 | L-605 |
| S-816 | M-308 |

The use of these materials has introduced problems in fabrication which had not previously been encountered. Foremost among these problems are those of maintaining the requisite ultimate tensile strength under extreme conditions of vibration and temperature while maintaining a structural joint free of concentrated stresses without introducing excessive weight to the structure. Meeting these problems requires a lightweight fastener which will itself exhibit an ultimate tensile strength of the order of 300,000 p.s.i. while withstanding sonic vibration levels of as high as 180 decibels at frequencies of 2 to 3 million cycles throughout ranges of extreme temperatures. Further, the ideal fastener must avoid imposition of concentrated stresses in the structural material surrounding the fastener.

In contrast to these needs, commonly available aircraft fasteners of the conventional bolt and nut design which depend upon compressive forces exerted on the parent structural material in the under-head bearing area (i.e. axially of the bolt) are capable of withstanding vibrational frequencies in the neighborhood of only 65,000 cycle. Presently accepted specifications require only that such bolts withstand a maximum fatigue load of approximately 45% of the minimum ultimate tensile strength of the bolt at an average vibrational frequency of 65,000 cycles. Thus, a fastener rated at 180,000 p.s.i. ultimate tensile strength has been considered acceptable if it will sustain a dynamic stress of 93,000 p.s.i. (calculated at the root area) at the prescribed vibrational frequency of 65,000 cycles.

Another problem facing the aircraft and missile industry is the development of fasteners which will withstand the extremely high temperatures encountered, as the aforementioned tensile strength is further diminished by elevated temperatures. This phenomena is so pronounced that it may be necessary to use fasteners rated at 300,000 p.s.i. at temperatures of, say, 700° F. in order to maintain a structural strength equivalent to that of a 180,000 p.s.i. under normal environmental temperatures such as had been previously encountered. When it is considered that an aircraft traveling at 35,000 ft. elevation at a speed of Mach 2 develops a skin temperature of approximately 600° F. due to surface friction, it is seen that the aforementioned problems become extremely pressing and accentuate the need for a more satisfactory fastener. In structures intimately associated with gas turbines, turbosuperchargers and jet engines, temperatures in the neighborhood of 2,000° F. are encountered introducing problems of plastic deformation arising after prolonged exposure to stresses below the yield strength of the fastener. This phenomena, known as "creep," is extremely unpredictable and its effect is determined only after prolonged tests spanning periods of 100 to 100,000 hours.

If the temperatures encountered were to remain consistently at such high levels, the answer would appear to lie in merely constructing fasteners heat treated and surface stressed to a higher degree than heretofore. However, such a fastener becomes quite brittle at the low temperature end of the ranges encountered. Under such conditions, bolt heads are likely to "pop" or break away from the bolt causing a complete failure of the fastener.

A still further problem resides in the demands for light weight. Pound for pound, an aircraft or missile is said to have more fasteners than any structure which human beings have ever constructed. The wing of a modern bomber comprises an excess of 15,000 fasteners, whereas the entire aircraft uses over one million fasteners. A fighter comprises over 13,000 structural parts assembled with approximately 20 times that number of fasteners. Even with the swing to fasteners constructed of "exotics" where 600 lbs. of titanium can maintain structural integrity previously necessitating over 1,000 lbs. of steel fasteners, the fasteners themselves constitute 5 to 8% of the weight of a modern aircraft. Thus, it is no surprise that an aircraft manufacturer will spare no expense in eliminating a fraction of a pound of weight wherever he can safely do so, particularly in the fasteners.

Recently, work has been done in developing high-fatigue bolts in the 180,000 p.s.i. and 220,000 p.s.i. ultimate strength categories which bolts will withstand over 3,000,000 cycles under the aforementioned loading condition. This work has involved use of "exotic" metals, precision cold working of threads and head fillets and improved hydrogen-free plating techniques, but has confined itself to variations of the conventional threaded compressive fastener. In such fasteners a compressive force is exerted axially of the fastener (i.e., between the head and nut) so as to place the lapped edges of the metals under compressive stresses running transverse to the plane of the metal. Thus, while the tensile strength of the fastener itself has been improved, the problem of uneven (and thus concentrated) stress patterns in the areas of the structural material surrounding the fastener hole has been ignored. This concentration of stresses in the under head bearing area of the metal adjacent to the fastener hole may be aggravated (and further complicated by the introduction of bending stress in the fastener) due to eccentric loading as may occur through excessive hole size, misalignment or drifting of the parent metals.

This invention stems from a realization of the foregoing problems and from a recognition of the deficiencies of existing fasteners, and has as its objects:

(1) The provision of a high strength fastener which will reduce stress concentration and fatigue in the parent metals being joined by the fasteners;

(2) The provision of a high strength fastener which will impart uniform radial pre-stress to the parent metals in the area surrounding the fastener;

(3) The provision of a high strength fastener which may be used in holes drilled or punched to standard tolerances without necessitating expensive tapering or reaming operations;

(4) The provision of a high strength fastener which will exhibit high fatigue resistance under stresses of the order of 300,000 p.s.i. while withstanding vibrational frequencies of 2 to 3 million cycles at levels as high as 180 decibels;

(5) The provision of a high strength fastener which will maintain the aforesaid characteristics throughout ranges of extremes temperature conditions;

(6) The provision of a high strength fastener which will maintain the aforesaid characteristics and which will be extremely light in weight;

(7) The provision of a high strength fastener which includes provision for sealing the fastener hole; and (8) The provision of a high strength fastener of the blind-fastener type.

These and other objects of the invention will be better understood by a consideration of the ensuing specification and the accompanying darwings illustrating preferred embodiments of the same, and in which:

FIGURE 1 is an exploded perspective view illustrating the elements of one embodiment of the invention, FIGURE 2 is an exploded perspective view illustrating the elements of another embodiment of the invention, FIGURE 3 is a cross sectional view of a structural joint including the fastener of FIGURE 1, and FIGURE 4 is a cross sectional view of a structural joint including the fastener of FIGURE 2.

Referring to FIGURE 1, the basic elements of the fastener include a tapered-shank bolt 1, a complementary internally tapered sleeve 2, and a threaded nut 3. The tapered shank bolt includes a driving head 4 which may be of any desired configuration and is here illustrated as a conventional hexagonal head. The shank of the bolt includes a tapered portion 5 of a length preferably chosen to equal the total width of the parent metals to be joined. This tapered portion is uniformly tapered throughout its length. The shank terminates in a threaded portion 6 adapted to receive the cooperating nut 3. The shank portion may include an annular groove 7 for the reception of a sealing member such as an O ring 8, this groove preferably being located at the juncture of the head and shank. Alternatively, the groove may be eliminated and the sealing member nested at the juncture of the head and shank, or the groove may be located on the shank at a position spaced from the head in order to provide a seal between the shank and the internal bolt-hole surface.

The sleeve 2 is formed with an internal tapered surface 9 complemental to the surface of the aforesaid tapered portion 5 of the bolt shank, inasmuch as the sleeve is constructed of high-strength material which is capable of only limited distortion or flow, the sleeve is slit longitudinally to permit expansion of the sleeve. While the slit may be omitted or a single slit may extend the entire length of the sleeve, it is preferable to provide two or more slits 10, 11—17, the alternate slits extending inwardly from opposite ends of the sleeve. These slits are of a length such as to overlap as seen in the area between construction lines A—A and B—B of FIGURE 2. This area preferably lies contiguous to the juncture between the two parent metals and constitutes a transition zone in which the sleeve is capable of limited distortion to accommodate misaligned or unequal size holes in a manner yet to be described.

The bolt 1 and sleeve 2 can be preassembled, the friction at the complemental tapered surfaces serving to retain them in assembled relationship in the manner of the well-known Morse tapered chucks. Thus, the preassembled bolt and sleeve may be inserted from one side of a structure and a nut 3 applied to the threaded portion 6 in a manner illustrated in FIGURE 3. The nut 3 is of conventional construction, being provided with internal threads 18 complemental to those of the threaded portion 6 and having any desired driving connection such as here depicted as a hexagonal surface. Alternatively the nut may be omitted and the bolt inserted into a tapered sub-assembly of the parent structure. After insertion, torque is applied through the respective driving connections of the bolt and nut to cause the nut to run down on the bolt shank and force the sleeve axially toward the bolt head while placing the bolt shank under limited tension.

This relative movement of the sleeve 2 over the tapered portion 5 of the bolt shank brings about a camming action which tends to expand the sleeve radially into tight engagement with the contiguous fastener hole surfaces. It should be noted that expansion of the sleeve is facilitated by the aforementioned slits 10. This is essential inasmuch as the sleeve is constructed of a rigid material not capable of substantial plastic flow under the conditions of temperature, stress and vibration to which it is to be subjected. By providing the sleeve with a plurality of slits 10–17 as previously described, the expansion is uniformly distributed throughout 360° of the fastener circumference. Further, the provision of distinct slits extending from alternate ends of the sleeve permits differential expansive movement in those portions of the sleeve disposed in the respective parent metals. Thus, should slight differences exist in the internal dimensions or in alignment of the holes in the respective parent metals, the sleeve is permitted to expand differentially into tight engagement throughout the thickness of each of the respective parent metals, and any transition cone of other than optimum engagement is reduced to an inconsequentially short segment of the axial length of the fastener, in a manner now to be described. This phenomena is best understood by reference to FIGURE 2, in which the fastener is shown in its assembled relationship, the disparity of hole size and the expansion of the sleeve being greatly exaggerated to illustrate the function of the alternate slits. It will be noted that the hole in parent metal 20 is somewhat larger than the hole in parent metal 19, illustrating the fact that variations of hole size within normally accepted commercial tolerances can be accommodated by the differential expansion of this sleeve. Thus, slits 11 and 13 (and other slits in the portion of the sleeve disposed within the larger hole) have expanded to a greater degree than those slits disposed within the smaller hole of parent metal 19 (i.e. slits 10, 12). Also, it can be seen that the lesser degree of expansion has occurred uniformly throughout the slits 10, 12, etc. disposed within the smaller hole. On the other hand, the slits 11, 13, etc. disposed within the larger hole have expanded uniformly (to a greater degree) throughout the width of the parent metal 20 while expanding only to a more limited degree at the inner extremities which are disposed within the confines of the holes at parent metal 19. The area between this maximum expansion and the more limited expansion may be called a transition zone, and it is noted that this zone is confined to the area of overlap of the alternate slits 10, 12, 14, 16 with the slits 11, 13, 15, 17. This area, or transition zone, is illustrated in FIGURE 2 between construction lines A—A and B—B. Thus, the transition zone is held to a minimum of the longitudinal length of the sleeve and expansion to optimum tight engagement with the parent metal is assured throughout substantially the entire thickness of both parent metals. In order to further assure this tight engagement throughout the thickness of both parent metals, the length of the complementary bolt and sleeve tapers is chosen to equal or slightly exceed the total thickness of the two parent metals.

Substantially the same phenomena occurs when the fastener is used in holes which are not precisely aligned or which are not perfectly circular. In such instances the slits in some segments of the circumference of the sleeve may expand to a greater degree than those in other segments in order to accommodate the aforesaid irregularities.

Further, the fact that the respective alternate slits overlap in the transition zone permits the expansion in this area where limited distortion of the sleeve metal takes place to be shared by all of the slits, as distinguished from expansion throughout the majority of the sleeve which is absorbed in alternate slits only. This reduces the very limited plastic flow necessary to a degree which permits the use of hard "exotic" metals essential to aircraft and missile use, in contradistinction to the soft flowable metals commonly used in expansive fasteners such as disclosed in Blakeslee U.S. Patent 1,758,924.

Should it be desirable to join parent metals of unlike thickness the transition zone of the sleeve can be located adjacent to the juncture of the parent metals by the appropriate choice of length of the respective slits, thereby preserving a uniformly tight engagement of the sleeve with each parent metal throughout substantially its entire thickness.

Inasmuch as the sleeve is constructed of hard, relatively non-flowing metals, the expansion of the sleeve into uniform tight engagement with the hole surfaces imparts a uniform radial pre-stress to the parent metals in the areas surrounding the holes. It is this pre-stress that is effective to distribute the load evenly around a given fastener and among a plurality of fasteners associated with the same parent metal. Thus, the uneven stress concentration present around holes in the case of the compressive fastener is avoided, and fatigue fractures and progressive failures whereby fracture at one stress concentration point serves to transfer excessive load progressively to other concentration points is avoided.

The fastener of FIGURES 3 and 4 is similar in basic concepts to that of FIGURES 1 and 2, except that the number of slits is reduced to two and that the fastener is of the "blind" fastener type. With the increased speed of modern aircraft, airfoil configuration has become so thin that it is often impossible to reach the inside of an airfoil in order to assemble a fastener. While "blind" rivets have been used, rivets are inherently non-uniform in the stresses incurred within themselves (particularly bending stresses) and imparted to the surrounding structure. "Blind" fasteners of the threaded type have been constructed as disclosed in the Rudolph M. Vaughn U.S. Patent No. 2,863,351 issued Dec. 9, 1958. These fasteners, however, depend upon compressive forces against the parent metal and are subject to the deficiencies previously described. Expansive fasteners of the "blind" type have also been disclosed wherein the expansive sleeve is of a soft, flowable metal (see Netherlands Patent 40,582) and therefore are unacceptable for use in aircraft or missile structures.

The fastener of FIGURES 3 and 4 exhibits the features of a uniformly applied pre-stress as outlined in connection with the embodiment of FIGURES 1 and 2, while permitting assembly in the manner of a "blind" fastener. The tapered sleeve 21 includes an outwardly disposed annular flange 22 at its upper edge. Also included are slits 23, 24 disposed longitudinally of the sleeve from alternate ends of the sleeve and overlapping in a transition zone near the center of the sleeve in a manner similar to those of FIGURE 1. It will be noted that slit 23 extends through the annular flange 22 thus providing sharply defined edges which engage the surface of the parent metal 25 and serve to lock the sleeve against rotation with respect thereto. These slits also serve as a means of engagement for an appropriate spanner wrench during tightening of the fastener. Additional means such as apertures in the flange (not shown) or bosses on the underside thereof may be provided for this purpose.

At the end of the sleeve removed from the flange, the sleeve is provided with a surface 27 for engagement with a complementary surface 28 on bolt 29. These surfaces 27 and 28 are provided with means to prevent relative rotation of the nut and sleeve, such as a knurled surface (FIG. 1), ribbed surface (not shown), keyed surface (now shown), or an antifriction material 30 such as rubber or plastic bonded to one or both surfaces as shown in FIGURE 4.

In use, the "blind" fastener of FIGURES 3 and 4 is preassembled, the nut 29 being run down on the threaded portion 6 of bolt 1 sufficiently far to bring the cooperating friction surfaces 27 and 28 into firm engagement. The fastener assembly may then be inserted through the openings of the parent metals 25 and 26 to a point where flange 22 engages the surface of parent metal 25. The exertion of a slight downward pressure on the assembly will serve to engage the holding means of flange 22 (e.g. slit 23) with the surface of parent metal 25. Application of torque to the bolt head will rotate the bolt with respect to the sleeve and nut and cause further run-down of the nut and consequent expansion of the sleeve in a manner as described with respect to the embodiment of FIGURES 1 and 2.

It will be noted that where a resilient friction surface 3 is used, this surface may be caused to flow into tight sealing engagement with the surface of the shank of bolt 1 and with the surface of the hole of parent metal 26, thus serving the dual function of preventing relative rotation of the unit and sleeve and of providing a seal against intrusion of corrosive materials into the fastener holes or sleeve assembly. Should more complete sealing be desired, the nut may be of the dome type in which the threaded opening does not extend completely through the nut.

From a consideration of the foregoing description and the accompanying drawings, it is evident that this invention provides a high-strength, lightweight fastener assembly which is effective to fasten materials under adverse environment conditions and avoid failures of fasteners or surrounding metals through the application of a uniform pre-stress to the surrounding metals. Modification of the described embodiments will readily occur to those skilled in the art, and the invention is therefore not to be regarded as limited to the particular embodiments described, but to extend to all manifestations of the basic inventive concept as defined in the following claims:

I claim:

1. A high-strength fastener assembly for insertion through substantially aligned apertures in structural members of a predetermined thickness, said assembly comprising a bolt, sleeve, and nut; said bolt including a driving head, a tapered shank portion, and a threaded nut receiving portion, said sleeve being constructed of high strength material and comprising an inner surface tapered complementally to said tapered shank portion and a substantially cylindrical outer surface, the length of said sleeve and said tapered portion closely approximating said predetermined thickness, said nut comprising a driving surface and internal threads cooperable with said threaded nut receiving portion whereby torque imparted to said driving head and said driving surface is effective to cam said sleeve and expand the same outwardly over said tapered shank portion and impart a uniform pre-stress to said structural members throughout said predetermined thickness surrounding said apertures.

2. The high-strength fastener assembly set forth in claim 1 wherein said sleeve includes a slit extending longitudinally thereof.

3. A high-strength fastener assembly comprising a bolt, sleeve, and nut; said bolt including a driving head, a tapered shank portion, and a threaded nut receiving portion; said sleeve being constructed of high-strength material and comprising an inner surface tapered complementally to said tapered shank portion and a substantially to said tapered shank portion and a substantially cylindrical outer surface, said sleeve being further characterized by a plurality of slits extending longitudinally thereof, alternate slits of said plurality extending from opposite ends of said sleeve and overlapping each other in a transition zone; said nut comprising a driving surface and internal threads cooperable with said threaded nut receiving portion whereby torque imparted to said driving head and said driving surface is effective to cam said sleeve and expand the same outwardly over said tapered shank portion, said expansion being absorbed in said slits and in limited distortion of said sleeve within said transition zone.

4. A high-strength fastener assembly for joining lapped metallic structural metals having substantially aligned holes therein, said assembly extending throughout said aligned holes and comprising a bolt, sleeve, and nut; said bolt including a driving head, a tapered shank portion, and a threaded nut receiving portion; said sleeve being constructed of high-strength material and comprising an inner surface tapered complementally to said tapered shank portion and a substantially cylindrical outer surface, said sleeve being further characterized by a plurality of slits extending longitudinally thereof, alternate slits extending from opposite ends of said sleeve and overlapping each other in a transition zone contiguous to the juncture of said lapped structural members; said nut comprising a driving surface and internal threads cooperable with said threaded nut receiving portion whereby torque imparted to said driving head and said driving surface is effective to cam said sleeve over said tapered surface and expand said sleeve outwardly, said expansion being absorbed in said slits and in limited distortion of said sleeve within said transition zone.

5. A high-strength fastener assembly for joining lapped metallic structural metals of predetermined thickness and having substantially aligned apertures therein, said assembly extending through said aligned apertures and comprising a bolt, sleeve, and nut; said bolt including a driving head, a tapered shank portion, and a threaded nut receiving portion, said sleeve being constructed of high strength material and comprising an inner surface tapered complementally to said tapered shank portion and a substantially cylindrical outer surface, the length of said sleeve closely approximating said predetermined thickness, said sleeve being further characterized by a plurality of radially spaced slits extending longitudinally thereof, alternate slits extending from opposite ends of said sleeve and overlapping each other in a transition zone contiguous to the juncture of said lapped structural members, said nut comprising a driving surface and internal threads cooperating with said threaded nut receiving portion whereby torque imparted to said driving head and to said driving surface is effective to cam said sleeve and expand the same outwardly over said tapered shank portion and impart a uniform pre-stress to the area of said structural members surrounding said apertures, said pre-stress extending uniformly throughout said predetermined thickness.

6. A blind-bolt high strength fastener assembly for joining lapped metallic structural metals of predetermined thickness and having substantially aligned apertures therein, said assembly extending through said substantially aligned apertures and comprising a bolt, sleeve, and nut; said bolt including a driving head, a tapered shank portion, and a threaded nut receiving portion, said sleeve surrounding said tapered portion and being constructed of high strength material and comprising an inner surface tapered complementally to said tapered shank portion and a substantially cylindrical outer surface, the length of said sleeve closely approximating said predetermined thickness, a flange extending outwardly from the end of said sleeve adjacent to said driving head, the end of said sleeve adjacent to said threaded portion comprising a friction surface, said nut having an outer diameter at least as small as the diameter of said cylindrical surface of said sleeve and comprising internal threads cooperating with said threaded nut receiving portion of said bolt and an elastomeric friction surface cooperating with said first mentioned friction surface of said sleeve to prevent relative rotation of said bolt and said sleeve, whereby torque applied to said driving head of said bolt is effective to run said nut down on said threaded portion and to cam said sleeve and expand the same outwardly over said shank portion to impart a pre-stress to the area of said structural members surrounding said apertures.

7. A blind-bolt high strength fastener assembly for joining lapped metallic structural metals of predetermined thickness and having substantially aligned apertures therein, said assembly extending through said substantially aligned apertures and comprising a bolt, sleeve, and nut; said bolt including a driving head, a tapered shank portion, and a threaded nut receiving portion, said sleeve surrounding said tapered portion and being constructed of high strength material and comprising an inner surface tapered complementally to said tapered shank portion and a substantially cylindrical outer surface, the length of said sleeve closely approximating said predetermined thickness, a flange extending outwardly from the end of said sleeve adjacent to said driving head, the end of said sleeve adjacent said threaded portion comprising a friction surface, said sleeve being further characterized by a plurality of radially spaced slits extending longitudinally thereof, alternate ones of said slits extending from opposite ends of said sleeve and overlapping each other in a transition zone contiguous to the juncture of said lapped structural members, said nut having an outer diameter not exceeding diameter of said cylindrical surface of said sleeve and comprising internal threads cooperating with said threaded nut receiving portion of said bolt and a friction surface cooperating with said friction surface of said sleeve to prevent relative rotation of said bolt and said sleeve whereby torque imparted to said driving head of said bolt is effective to run said nut down on said threaded portion and to cam said sleeve and expand the same outwardly over said shank portion to impart a pre-stress to the area of said structural members surrounding said apertures, said pre-stress extending uniformly throughout said predetermined thickness.

8. A blind-bolt high strength fastener assembly as set forth in claim 6 wherein said friction surfaces of said sleeve and of said nut are of frustro-conical configuration.

9. A blind-bolt high strength fastener assembly as set forth in claim 6 wherein at least one of said friction surfaces comprises an elastomeric material.

10. A blind-bolt high strength fastener assembly as set forth in claim 6 wherein said alternate ones of said slits extending from said end of said sleeve adjacent said threaded portion extend through said flange to define driving connections for a spanner wrench.

References Cited by the Examiner
UNITED STATES PATENTS 3,178,984   4/1965   Barothy _____ 85—9 X RICHARD W. COOKE, JR., *Primary Examiner*.